United States Patent
Marantz et al.

[15] 3,669,878
[45] June 13, 1972

[54] TREATMENT OF DIALYSATE SOLUTION FOR REMOVAL OF UREA

[72] Inventors: Laurence B. Marantz, Sherman Oaks; Michael A. Greenbaum, Los Angeles, both of Calif.

[73] Assignee: The United States of America as represented by the Secretary, Department of Health, Education and Welfare

[22] Filed: Nov. 25, 1970

[21] Appl. No.: 92,864

Related U.S. Application Data

[63] Continuation of Ser. No. 780,417, Dec. 2, 1968, abandoned.

[52] U.S. Cl. ............................ 210/22, 210/38, 210/195, 210/321
[51] Int. Cl. ........................................................ B01d 13/00
[58] Field of Search ............... 210/22, 321, 29, 195, 295, 210/38, 60

[56] References Cited

UNITED STATES PATENTS

| 3,506,126 | 4/1970 | Serfuss et al. | 210/321 X |
| 3,463,728 | 8/1969 | Kolobow et al. | 210/321 X |
| 3,268,441 | 8/1966 | Lindstrom | 210/321 X |

OTHER PUBLICATIONS

Flower; Industrial Research Fellow Report No. 4, The Chemical Engineer, May 1968, pp. 120–131

Amphlett et al.; Synthetic Inorganic Ion Exchange Materials I, J. Inog. Nucl. Chem. Vol. 6, 1958, pp. 220–235

*Primary Examiner*—Reuben Friedman
*Assistant Examiner*—Richard Barnes
*Attorney*—Robert E. Geauque

[57] ABSTRACT

A treatment of dialysate solution which circulates past the membrane of an artificial kidney for removal of urea, which solution employs a combination of urease to break down urea to ammonium carbonate, and zirconium phosphate in the solution as a structure for the removal of ammonium ions.

15 Claims, 1 Drawing Figure

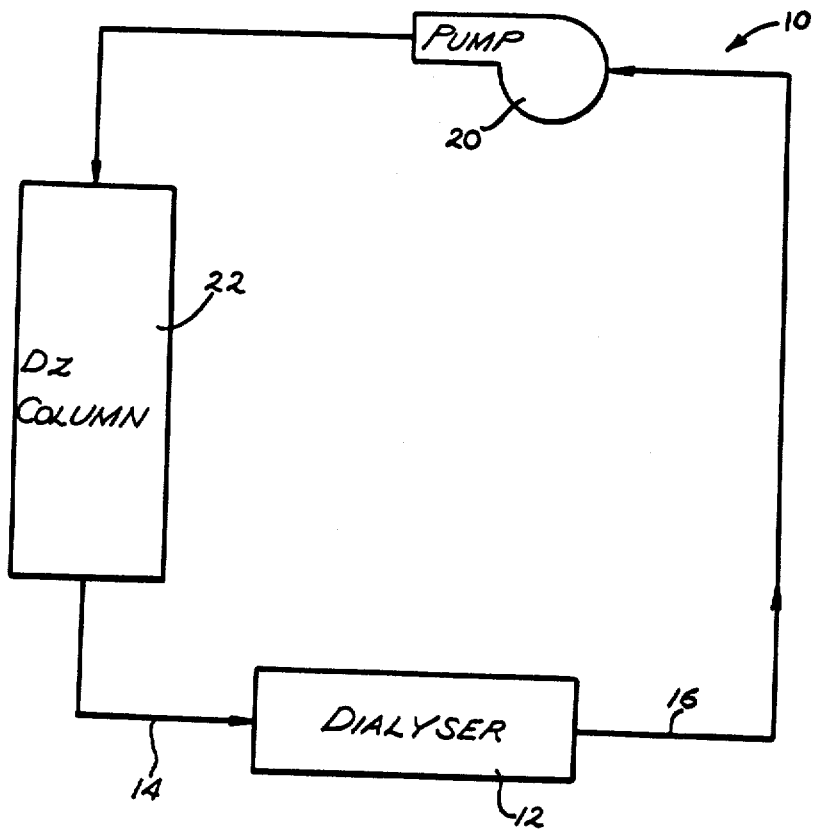

TREATMENT OF DIALYSATE SOLUTION FOR REMOVAL OF UREA

This application is a continuation of Ser. No. 780,417, filed Dec. 2, 1968 and now abandoned.

BACKGROUND OF THE INVENTION

Urea is the principal end product formed from the metabolism of protein. It is extremely diffusible and consequently is distributed evenly in the water of all tissues. Urea normally has no useful function in the body and is excreted almost entirely by the kidneys. The urea in plasma is filtered by the kidney glomerulus, but under normal conditions approximately forty percent of this filtered portion back diffuses into the blood.

Impaired renal function causes an elevated concentration of urea in the bloodstream. Elevated urea concentration occurs in a number of pathological conditions and may be ascribed to increased production in the course of accelerated protein metabolism, to decreased elimination as a result of impaired kidney function or to a combination of these two processes. With constant protein intake, the degree of azotemia depends upon the extent and type of kidney damage. Uremia is marked by nausea, vomiting, headache, vertigo, dimness of vision and finally coma or convulsions and death results.

The preferred remedy for this toxic state is renal homotransplantation. However, in some cases renal homotransplantation is not possible because of other medical problems of the patient. Additionally, life must be maintained until a proper renal transplant donor becomes available. Thus, dialysis has been developed.

Dialysis has been developing along two parallel pathways. In peritoneal dialysis, a warmed sterile dialysate is pumped into a uremic patient's peritoneal cavity. As mentioned above, urea is extremely diffusible so that it diffuses into the dialysate in the peritoneal cavity. Thereupon, removal of the dialysate removes a portion of the urea from the body to reduce the body concentration thereof. In present peritoneal dialysis systems, the dialysate is injected, permitted to acquire its urea, and then the dialysate is removed and disposed of. Thus, large quantities of sterile dialysate are necessary so that a large quantity of material is handled.

Hemodialysis has also been employed to lower urea concentration in cases of chronic renal failure. In this case, arterial blood is removed from the patient, passed on one side of a dialysis membrane, and then is returned to the patient's vein. When there is low pressure drop on the bloodflow side of the dialysis membrane, blood pressure alone causes circulation. However, low pressure drop implies large passages, and when the volume of blood external of the patient is excessive, the system must be primed with blood. This leads to the problem of the dangers of donors' blood, as in transfusion cases. Dialysate is employed on the other side of the dialysis membrane, the dialysate and dialysis membrane being designed so that urea passes from the bloodstream into the dialysate. In the prior devices, the dialysate flows past the dialysis membrane, and is employed until urea concentration in the dialysate reduces urea transport. Thereupon, the dialysate is disposed of and a fresh solution is employed. This means that concentration gradients across the dialysis membrane are continuously changing to change urea transport rates. It also means that a large quantity of dialysate is employed and disposed of. These factors are detrimental to proper and economic dialysis.

SUMMARY OF THE INVENTION

In order to aid in the understanding of this invention it can be stated in essentially summary form that it is directed to a recirculating dialysate solution for renal function dialysis. Urease is employed to change urea into ammonium carbonate, and zirconium phosphate is employed to remove the ammonium ion from the dialysate. Thus, the dialysate can be recirculated for reuse. The urease can either be in solution in the dialysate, or it can be supported on a substrate, or supported on the zirconium phosphate.

Accordingly, it is an object of this invention to provide a treatment of dialysate solution which permits recirculation of the dialysate. It is another object to employ urease in combination with zirconium phosphate in recirculating dialysate to maintain the urea concentration in the dialysate substantially at zero when the dialysate is employed in reducing urea concentration in the body. It is another object of this invention to employ urease in combination with zirconium phosphate to break down urea in the dialysate into ammonium ion and to remove the ammonium ion from the dialysate to maintain the ammonium concentration at a low level. It is still another object to employ urease and zirconium phosphate to maintain the urea concentration in a circulating dialysate at a sufficiently low level that it may be continually re-employed for dialysis. Other objects and advantages of this invention will become apparent from a study of the following portions of this specification, the claims and the attached drawing.

BRIEF DESCRIPTION OF THE DRAWING

The single FIGURE of the drawing shows a schematic arrangement of the treatment of recirculating dialysate solution.

DESCRIPTION OF PREFERRED EMBODIMENT

One form of recirculating dialysis apparatus is generally indicated at 10. The recirculating system includes as a component a conventional dialyser 12. As illustrated, dialyser 12 is a conventional hemodialyser, of the nature of those which have been under development. The two layer Kiil, six layer Sheggs-Leonards, standard twin coil and the chronic coil dialysers are examples. The latter two are available from Tavenol Laboratories, Morton Grove, Ill. These are examples of hemodialysers wherein a dialysis membrane separates the dialysate and the blood. However, instead of the employment of hemodialyser 12, entry and exit trocars can be employed with cannula for peritoneal cavity tapping. However, while the recirculating apparatus is employable with peritoneal dialysis, it is preferred in hemodialysis, and therefore the description hereafter will be directed toward hemodialysis.

The examples of the hemodialysis apparatus mentioned above include bloodflow from the patient through dialyser 12, with the dialyser being provided with a dialysis membrane which separates the blood from the dialysate. The dialysate solution is of suitable nature for dialytic migration of bloodstream impurities from the bloodstream through the membrane into the dialysate. While there are a number of factors in the blood which must be removed in cases of chronic uremia, this invention is directed to the removal of urea, so the dialysate discussed is particularly suitable for that purpose. The dialysate is thus preferably a sodium chloride-glucose-water solution in sterile condition. The dialysate with substantially zero urea and ammonium ion concentration passes into dialyser 12 from inlet line 14. As described, urea is passed from the bloodstream flow on the one side of the membrane into the dialysate at a dialysance rate dependent upon urea concentration in the bloodstream, the membrane characteristics, and the character of the dialysate. In any event, the urea concentration in the dialysate as it leaves dialyser 12 by way of outlet line 16 represents a higher nitrogen value. Circulation through dialyser 12 is caused by pump 20 which is connected to take suction from the dialyser. Pump 20 discharges to column 22 wherein the nitrogen factor in the dialysate is removed from circulation.

Urease is an enzyme which is formed by various micro-organisms and is capable of causing the change of urea into ammonium carbonate. Urease is employed in the apparatus, and can be employed in either of two ways. In the first manner of employment, it can be dissolved into the dialysate so that as soon as urea is received in the dialysate through the membrane, the urea is changed into its ammonium carbonate product. The ammonium carbonate product is dissolved in and ionized in the dialysate, and the ammonium ion must be removed to maintain the nitrogen level of the dialysate sufficiently low to be effective in the receipt of urea through the dialysis membrane. Furthermore, the ammonium ion is objectionable in the inlet line to dialyser 12, because of the possibility of back diffusion of ammonium ion into the bloodstream.

To remove the ammonium ion, column 22 is packed with zirconium phosphate. Zirconium phosphate has ion exchange properties, exchanging and binding the ammonium ions from the solution in exchange for sodium ions originally adsorbed thereon. Thus, as the dialysate passes through column 22, the ammonium ions are fixed with the release of sodium ions. The sodium ions are present in large quantities in the dialysate and are not deleterious to proper hemodialysis of urea.

The preferred embodiment employs urease adsorbed on the zirconium phosphate. It has been established that urease can be adsorbed on zirconium phosphate by shaking an aqueous solution of urease with zirconium phosphate crystals. The extent of adsorption is a function of the concentration of urease, the time of shaking, temperature and subsequent treatment of the zirconium phosphate. For example, a solution of 20 milligrams of urease in 100 milliliters of distilled water was shaken with 5 grams of zirconium phosphate crystals for a period of 2 hours at 22° C. This was followed by three rinsings of the adsorbate with distilled water. This resulted in 67 percent of the original urease activity appearing on the zirconium phosphate. In the preferred embodiment, zirconium phosphate with urease adsorbed thereon is packed in column 22, so that urea breakdown to ammonium carbonate occurs in the column, together with immediate ammonium ion fixation. If necessary, column 22 is vented to discharge carbon dioxide gas. The preferred apparatus results in a dialysate, at the entrance to dialyser 12, which has a substantially zero ammonium ion concentration.

In a typical example of the present invention, two liters of dialysate solution were utilized to which was added 2 grams of urease and 1,000 grams of zirconium phosphate of 100–200 mesh. It is understood that any suitable dialysate solution can be utilized and the solution may contain any number of different components for particular purposes in connection with blood composition. In this example, the dialysate solution was circulated at the rate of 200 cc per minute through the system, and it was found that sufficient urea was removed from the dialysate solution to permit re-use of the solution. The typical equation for the action of the urease is as follows:

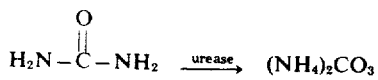

The removal of the ammonium ions by the zirconium phosphate is accomplished as follows:

$2NH_4^+ + Zr(NaPO_4)_2 \cdot H_2O \rightarrow Zr(NH_4PO_4)_2 \cdot H_2O + 2Na^+$ It is understood that the term zirconium phosphate utilized throughout the specification loosely defines zirconium phosphate ion exchangers, such as the zirconium phosphate sodium form set forth in the equation directly above. The sodium content of the sodium salt relates to a solution compatible with the particular purpose of the solution. Other forms of the zirconium phosphate ion exchangers which can be utilized are (a) zirconium phosphate potassium hydrogen form and (b) zirconium phosphate hydrogen form. Except for a few crystalline forms, the exact chemical structure of these materials is not well defined. As stated in U.S. Pat. No. 3,337,451, the term zirconium phosphate ion exchanger means zirconium phosphates in either gelatinous or crystalline forms. "These compounds can be represented in a generalized form that is believed to be their chemical composition; however, it should be recognized that these representations are by way of theoretical illustration and should not be interpreted as limitations. For example, zirconium phosphate may be represented as: $Zr(HPO_4)_2 \cdot H_2O$. Assuming this or a similar structure to illustrate the compound, it is seen that hydrogen is replaceable in an exchange process to varying degrees. Therefore, such materials may be designated as active hydrogen inorganic exchange materials." In a similar way, the sodium and potassium forms act as ion exchangers. The zirconium phosphate, as loosely defined herein, can be produced in various manners, such as taught in the article "Synthetic Inorganic Ion Exchange Materials I", "Zirconium Phosphate" by C. B. Amphlett, L. A. McDonald and M. J. Redman, J. Inor. Nucl. Chem., Vol. 6, p. 220, 1958; and the book entitled "Inorganic Ion Exchangers", by C. B. Amphlett, pp. 93–111, published in 1964, by Elsevier Publishing Company. As illustrated, the effect of the zirconium phosphate is to replace some of the sodium ions by ammonium ions in the zirconium compound. Any suitable concentrations of urease and zirconium phosphate in the solution can be utilized and the above example is by way of illustration only.

It is understood that the urease could be dissolved in the circulating dialysate fluid and that the zirconium phosphate could be added in particle form to produce a circulating slurry, in which case the column 22 would not be utilized. Also, it is understood that the urease could be absorbed on the zirconium phosphate and then the resulting product added to the dialysate solution to produce a circulating slurry.

We claim:

1. The method of treating a dialysate solution to remove urea, said solution containing the amount of sodium ions required to prevent imbalance in the patient, comprising the steps of:
   circulating the dialysate solution past the membrane of an artificial kidney;
   treating the dialysate solution with urease to convert urea to ammonium carbonate;
   treating the dialysate solution with a zirconium phosphate ion exchanger to remove the ammonium ions from the ammonium carbonate to a low enough concentration to permit recirculation of the solution past said membrane without addition of unacceptable amounts of ammonium ions to the patient; and
   recirculating the dialysate solution past said membrane of the artificial kidney.

2. The method as defined in claim 1 wherein the zirconium phosphate ion exchanger is located in a column through which the dialysate solution passes.

3. The method as defined in claim 2 wherein the urease is absorbed on the zirconium phosphate ion exchanger so that breakdown of urea into ammonium carbonate and removal of the ammonium ion from the dialysate occurs in the column.

4. The method as defined in claim 2 wherein the dialysate solution is circulated by pumping the dialysate solution past the artificial kidney membrane and through the column.

5. The method as defined in claim 1 in which the zirconium phosphate ion exchanger is added to the dialysate solution in particle form to produce a circulating slurry.

6. The method as defined in claim 1 in which the urease is added to the dialysate solution by being dissolved in the dialysate solution.

7. The method of treating a dialysate solution to remove urea, said solution containing the amount of sodium ions required to prevent imbalance in the patient, comprising the steps of:
   recirculating the dialysate solution past the membrane of an artificial kidney;
   treating the dialysate solution with urease to convert urea to ammonium carbonate; and
   treating the dialysate solution with a zirconium phosphate ion exchanger to remove the ammonium ions from the ammonium carbonate to a low enough concentration to permit recirculation of the solution past said membrane without addition of unacceptable amounts of ammonium ions to the patient.

8. In a hemodialysis apparatus which includes an artificial kidney and a dialysate recirculating system adapted to circulate a dialysate solution through said artificial kidney and thereby pick up urea, said dialysate solution containing the amount of sodium ions required to prevent imbalance in the patient;

urease in said recirculating system for converting the urea in said system to ammonia carbonate; and zirconium phosphate ion exchanger in said recirculating system for removing the ammonium ions from the ammonium carbonate to a low enough concentration to permit recirculation of the solution through said artificial kidney without addition of unacceptable amounts of ammonium ions to the patient.

9. In a method for treating a dialysate solution which circulates through an artificial kidney and thereby picks up urea, said solution containing the amount of sodium ions required to prevent imbalance in the patient; the improvement which resides in treating the dialysate solution with urease to convert urea to ammonium carbonate; and treating the dialysate solution with zirconium phosphate ion exchanger to remove the ammonium ions from the ammonium carbonate to a low enough concentration to permit recirculation of the solution through said artificial kidney without addition of unacceptable amounts of ammonium ions to the patient.

10. In a recirculating dialysate system containing a dialysate solution for receiving urea from an artificial kidney, a charge of urease serving to convert urea in the dialysate solution to ammonium carbonate, a charge of zirconium phosphate ion exchanger serving to remove ammonium ions from the ammonium carbonate, and means recirculating the dialysate solution from a urea receiving location in the artificial kidney through said charges and back to said urea receiving location.

11. A system according to claim 10 wherein said zirconium phosphate charge is contained in particle form within a column through which said dialysate solution passes.

12. A system according to claim 11 wherein said urease is adsorbed on the particles of zirconium phosphate ion exchanger.

13. A system according to claim 10 wherein said dialysate contains a predetermined amount of sodium ions.

14. In a method of treating a recirculating dialysate solution which picks up urea resulting from renal failure; the improvement which comprises treating the dialysate solution with urease to convert urea picked up by the dialysate solution to ammonium carbonate; and treating the dialysate solution with a zirconium phosphate ion exchanger to remove ammonium ions from the ammonium carbonate before the solution again picks up urea.

15. In an apparatus for treating a recirculating dialysate solution which picks up urea from a patient's blood through a membrane of a kidney dialysis system; the improvement comprising urease in said apparatus adapted to convert urea picked up at said membrane by said dialysate solution to ammonium carbonate; and zirconium phosphate ion exchanger in said apparatus for removing ammonium ions from the ammonium carbonate before the solution again picks up urea.

* * * * *